Feb. 1, 1944.   R. E. JELFS   2,340,534
MOTOR CONTROL SYSTEM
Filed Dec. 12, 1940   4 Sheets-Sheet 1

INVENTOR
R. E. JELFS
By Stevens and Davis
ATT'YS.

Feb. 1, 1944. R. E. JELFS 2,340,534
MOTOR CONTROL SYSTEM
Filed Dec. 12, 1940 4 Sheets-Sheet 4

INVENTOR
R. E. JELFS
By: Stevens and Davis
ATTYS.

Patented Feb. 1, 1944

2,340,534

UNITED STATES PATENT OFFICE 2,340,534

MOTOR CONTROL SYSTEM

Robert Edgar Jelfs, London, England, assignor to Automotive Products Company Limited, London, England Application December 12, 1940, Serial No. 369,886
In Great Britain February 16, 1940

6 Claims. (Cl. 60—97)

This invention relates to liquid pressure remote control systems, more particularly for operating soot blowers of boilers and the like.

The invention has for its object to provide an improved form of remote control installation in which one or more of the fluid motor cylinder units, when fed with pressure liquid, execute a predetermined number of reciprocations and then automatically cease working, the supply of pressure liquid, if desired, being transferred to another fluid motor unit. It is a further object of the invention to provide a form of remote control installation which is particularly suitable for the actuation of the soot blowers of boilers and the like and which is adaptable and easy to operate.

In a liquid pressure remote control system according to the invention a plurality of double-acting fluid motor units are fed with pressure liquid from a common source and are arranged to operate in succession, wherein a change-over valve device is provided with counting means which acts to transfer the supply of pressure liquid from one fluid motor unit to the next when a predetermined number of reciprocations have been made by said one fluid motor unit.

Further, in a liquid pressure remote control system in which a double-acting fluid motor unit is provided with a reversing valve device enabling it to reciprocate continuously when fed with pressure liquid, the present invention is characterised by the fact that the reversing valve device operates an adjustable counting means which cuts off the supply of pressure liquid to the fluid motor unit when the latter has made a predetermined number of reciprocations corresponding with the setting of the counting means.

According to another feature of the invention a liquid pressure remote control system is provided comprising in combination a source of pressure liquid, a plurality of double-acting fluid motor units, a reversing valve device operatively connected with each fluid motor unit to produce continuous reciprocation of the latter so long as the pressure supply to the reversing valve device is maintained, a change-over valve interposed between the pressure source and each of the reversing valve devices, whereby the pressure liquid can be diverted from the corresponding reversing valve device to the change-over valve device of another fluid motor unit, and counting means which are associated with each change-over valve device and are operated by the corresponding reversing valve device, so that when each of the fluid motor units (except the last in the sequence) has made a predetermined number of reciprocations depending upon the adjustment of the counting means, the change-over valve device belonging to said fluid motor unit is actuated and transfers the supply of pressure liquid to another of the fluid motor units.

Preferably, an auxiliary valve device is brought into operation by the counting means and causes a later fluid motor unit to commence operation before the previous fluid motor unit in the sequence has ceased operating, said auxiliary valve device conveniently acting to divert to the said later fluid motor unit, the liquid which is being rejected from the said previous fluid motor unit, the said later fluid motor unit being placed in connection with the source of pressure liquid when the previous fluid motor unit has finished its operation.

The invention further provides a soot blower system for a boiler or like furnace in which a plurality of blower nozzles for cleaning fluid, such as steam, are actuated by a liquid pressure remote control system as above set out.

Other novel features and advantages of the invention will be apparent from the following description and the accompanying drawings, in which one embodiment of the invention is illustrated by way of example and in which:

Figure 7 is a front elevation of the auxiliary valve device shown in Figure 4.

Figure 1:
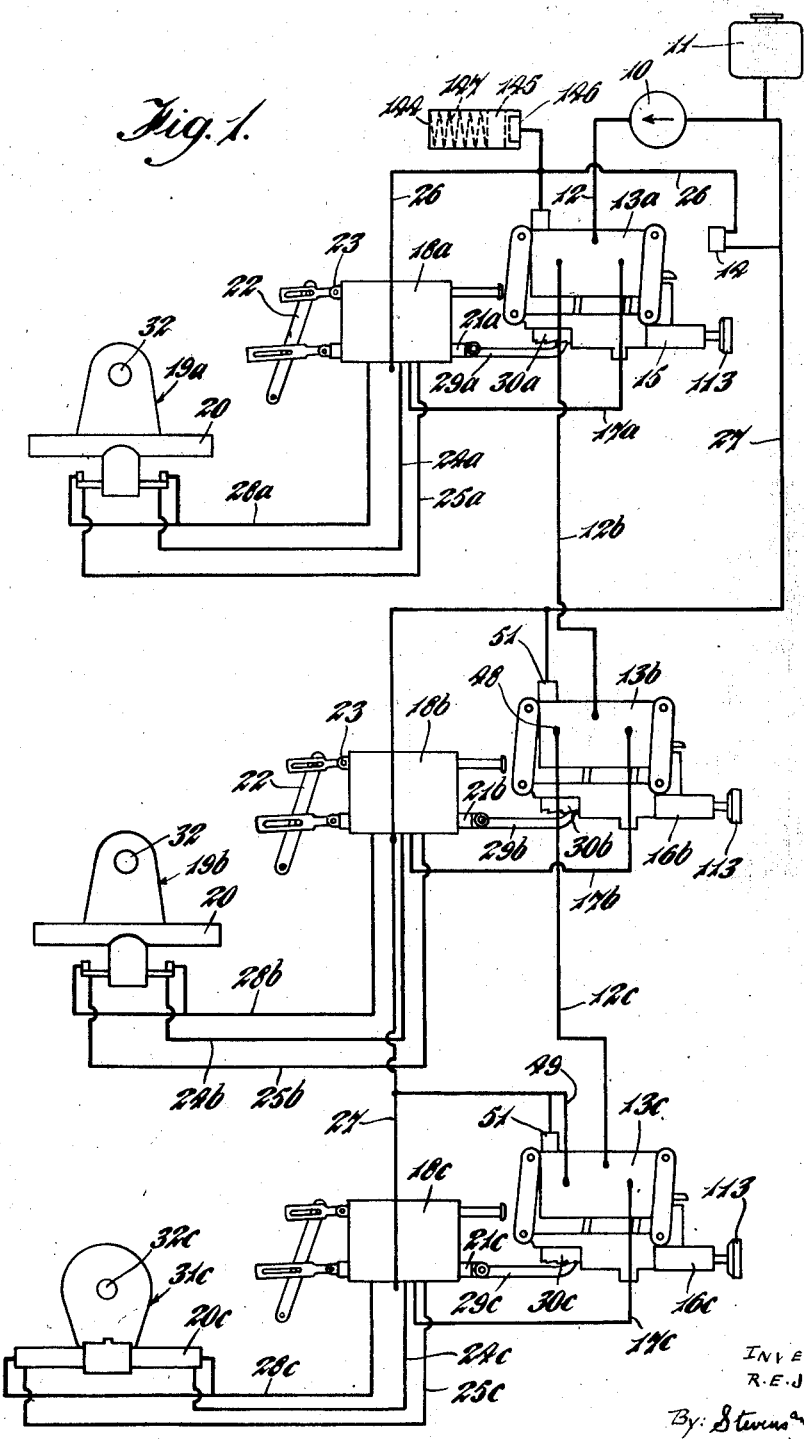
Figure 1 is a diagram showing the components and pipe connections for controlling a set of three blower devices.

In the system which is shown in Figure 1 a pump 10 conveniently driven by an electric motor is replenished from a reservoir 11 and delivers pressure liquid through a pipe 12 to a change-over valve device which is indicated at 13a and which in itself is similar in construction to other change-over valve devices indicated at 13b and 13c. It is associated with an auxiliary valve device shown diagrammatically at 14, and it embodies counting means 15 which are different in construction from the counting means 16b and 16c belonging to the change-over valve devices 13b and 13c, respectively.

A pipe 17a leads to a reversing valve device 18a, which latter is arranged to co-operate with a blower device 19a in such manner as to produce continuous reciprocation of a fluid motor cylinder unit 20 so long as pressure liquid is fed through the pipe 17a. The internal construction and the working of the reversing valve device 18a and the blower device 19a are described in my Patent No. 2,309,889, and as they form no part of the present invention it is not necessary to consider the arrangement in detail. The reversing valve device 18a includes a piston valve member 21a which is connected with an arm 22 actuated by the piston rod 23 of a hydraulic auxiliary motor. Pipes 24a and 25a act as interchangeable flow and return pipe lines leading to the blower device 19a, the pipe line through which pressure liquid is delivered being dependent upon the prevailing position of the piston valve member 21a. The other of the pipe lines 24a or 25a is connected by a pipe 26 to a main return pipe line 27 by way of the auxiliary valve device 14, which latter is open for the greater part of the time that the system is working, as will be hereinafter explained. At the end of each stroke of the fluid motor cylinder unit 20 (which stroke in the case of the retractable type of blower device may be short or long) a trip valve is operated in the blower device 19a so that pressure liquid from the prevailing flow pipe line 24a or 25a is diverted through a shunt pipe line 28a and operates the piston rod 23 so as to change over the arm 22 past a dead centre position, thus at the same time changing over the piston valve member 21a. In addition to reversing the supply and return connections to the pipe lines 24a and 25a this also connects the shunt pipe line 28a with the opposite end of the auxiliary motor within the reversing valve device 18a, so that the next time pressure liquid is diverted into the shunt pipe line 28a the piston rod 23 is again moved to its opposite position and the piston valve member 21a correspondingly shifted back. Thus at the end of each stroke of the fluid motor cylinder unit 20 the piston valve member 21a is moved smartly from its prevailing position to the other position and this motion is utilised in the present invention to actuate the changeover valve device 13a, with which latter the piston valve member is connected operatively by a pawl 29a and a series of rack teeth indicated at 30a.

In a similar manner a second retractable blower device 19b is connected by interchangeable flow and return pipe lines 24b and 25b and by a shunt pipe line 28b with a reversing valve device 18b connected operatively by a pawl 29b and rack teeth 30b with the second change-over valve device 13b. It will be appreciated that when pressure liquid is fed to either of the retractable blower devices 19a and 19b the first stroke of the corresponding fluid motor cylinder unit 20 rotates the corresponding nozzle shaft 32 in one direction, and through the medium of screw and nut mechanism (not shown) causes the usual blower nozzle to be advanced into the boiler or like furnace. The supply of steam or other cleaning fluid is under the control of a cam-actuated valve (not shown) which is arranged to open as the blower nozzle enters the furnace and to remain open so long as said nozzle is disposed within the furnace. As a substantial part of the full stroke is used in advancing the nozzle to the position in which it commences blowing, an arrangement is provided within each of the retractable blower devices 19a and 19b whereby the succeeding strokes of the fluid motor unit 20 are considerably shortened, so causing the blower nozzle to reciprocate a predetermined number of times all the while remaining within the furnace. Thus at the end of the first full advancing stroke the appropriate trip valve (not shown) is actuated, so diverting pressure liquid through the shunt pipe line 28a and causing the reversing valve device 18a to operate, the piston valve member 21a moving to the left, thus changing over the supply of pressure liquid and causing the next stroke of the fluid motor cylinder unit to commence, this of course moving the blower nozzle in a retracting sense. Just before the blower nozzle reaches the wall of the furnace the other trip valve is operated, so causing the piston valve member 21a to be moved to the right and initiating the next reciprocation of the fluid motor cylinder unit 20. When the blower nozzle again reaches its fully extended position its motion is reversed; it then makes another short stroke in a retracting sense within the furnace, and is again reversed so that it resumes its fully extended position. At this point its final retracting stroke commences and the blower nozzle moves back all the way to its fully retracted position. The operation of the trip valves causes this sequence of strokes, said trip valves being actuated by a cam device forming part of the corresponding blower device 19a or 19b.

The third blower device indicated at 31c is of the non-retracting type and has a fluid motor cylinder unit 20c, alternate strokes only of which are used merely to bring about uni-directional rotation of the nozzle shaft 32c, the drive being transmitted through the medium of a ratchet device (not shown). The blower device 31c is connected with its reversing valve device 18c by a pair of interchangeable flow and return pipe lines 24c and 25c and by a shunt pipe line 28c, the action of the reversing valve device 18c being exactly the same as the devices 18a and 18b so that movements of the piston valve member 21c towards the right are transmitted to the change-over valve device 13c by means of the pawl 29c. In the case of the reversing valve devices 18b and 18c the liquid returning from the blower devices 19b, 31c passes directly back to the pump 10 and reservoir 11 by way of the main return pipe line 27. It will be seen that the arrangement of the blower devices 19a, 19b and 31c and the reversing valve devices 18a, b and c shown in Figure 1 has the advantage that said reversing valve devices can be disposed well away from the blower devices and are thus not subject to the heat of the furnace, but as far as the present invention is concerned other reversing valve arrangements are suitable, such as those in which a reversing valve is actuated mechanically by the piston of the fluid motor unit, the chief consideration being the provision of a member (such as the piston valve member 21a, b or c) which is moved in one direction as one stroke of the fluid motor unit finishes, in the opposite direction as the next stroke finishes and so on.

Figure 2:
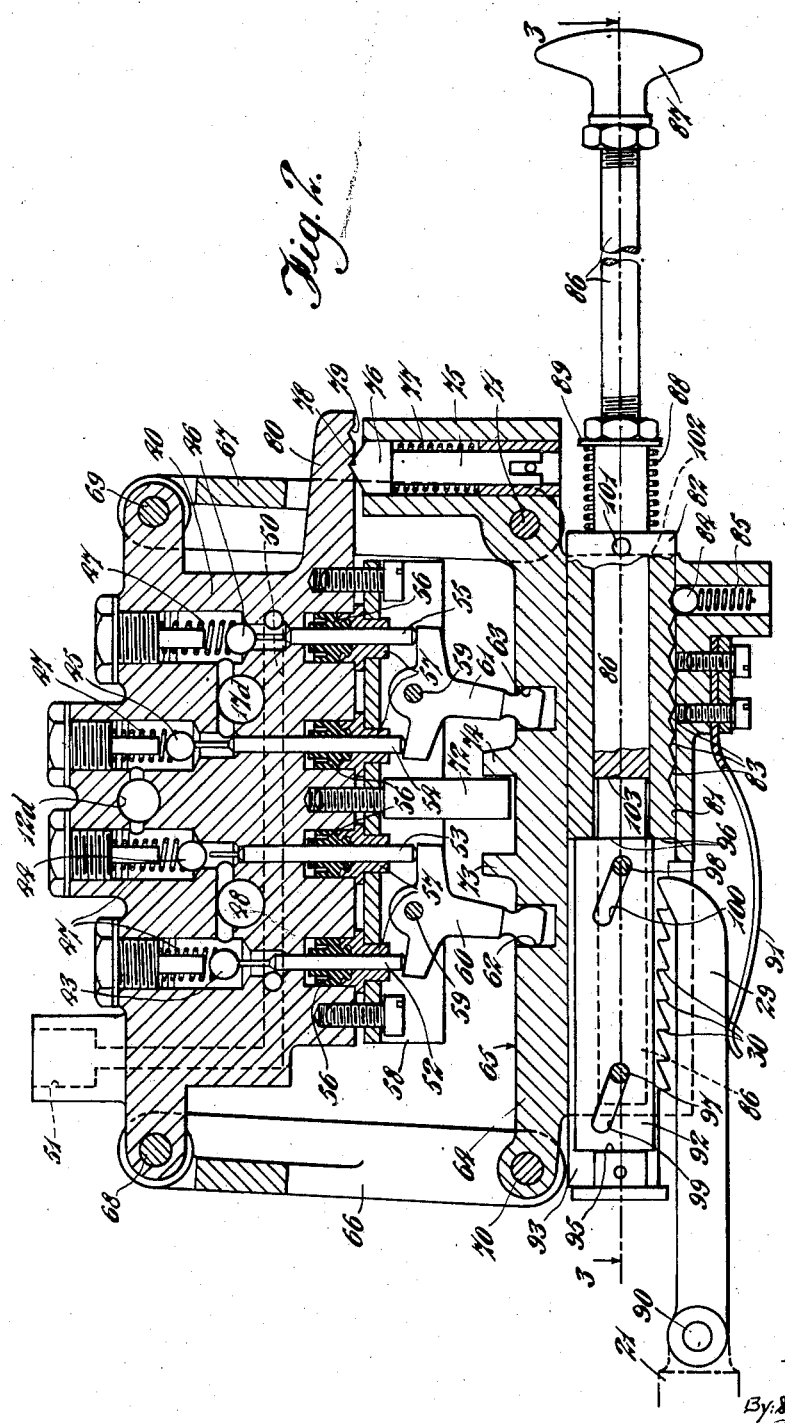
Figure 2 is a sectional elevation showing the construction of each of the change-over valve devices included in Figure 1.
Figure 3:
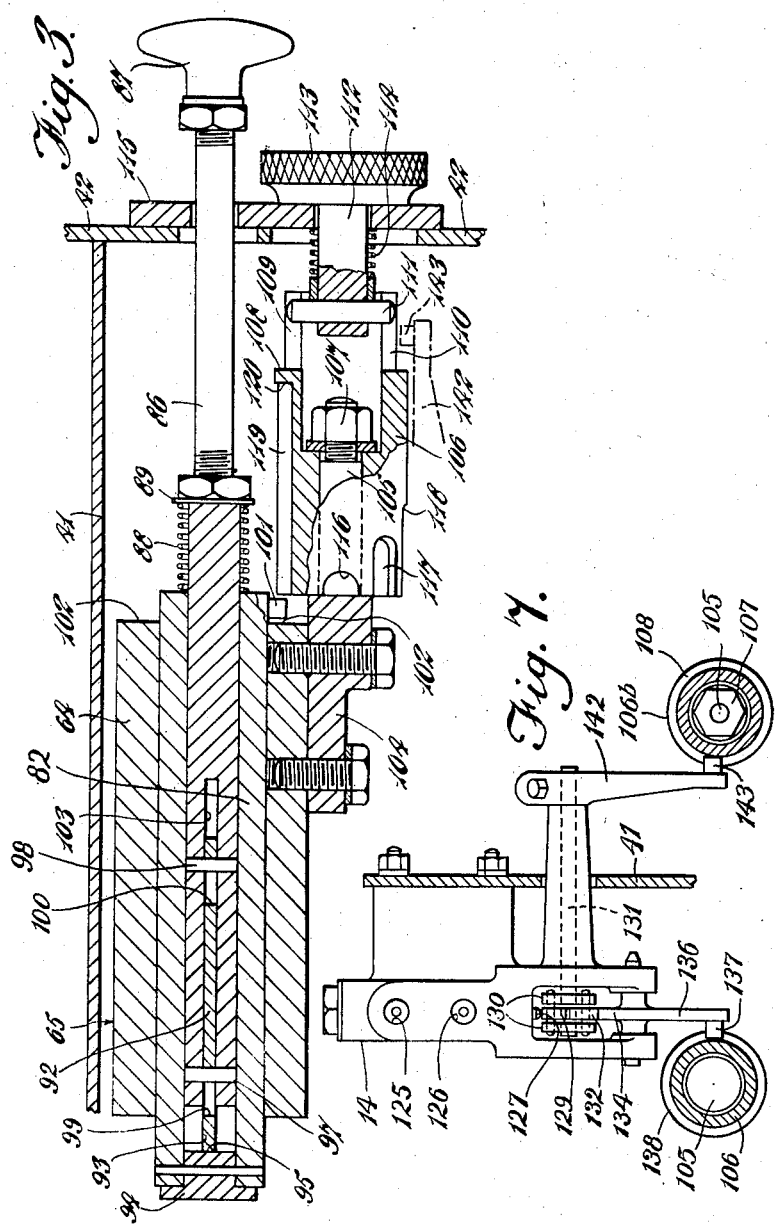
Figure 3 is a sectional plan taken on the line 3—3 of Figure 2 and showing the arrangement of the second and third change-over valve devices included in Figure 1.

The construction of each of the change-over valve devices 13b and 13c is shown in Figures 2 and 3. The device comprises a body 40 which is fixed and is conveniently supported by a partition 41 (see Figure 3) extending rearwardly from the front panel 42 of a control unit. The body is formed with four vertical bores containing ball valves 43, 44, 45 and 46, respectively, these being urged towards their seatings by coiled compression springs 47. A passage 12d receiving pressure liquid from the corresponding pipe 12b or c shown in Figure 1 leads into the spaces above both ball valves 44 and 45. The space below the valve 45 communicates with the space above the valve 46 and leads by a connection 17d to the corresponding pipe 17b or c adapted to conduct pressure liquid to the reversing valve device 18b or c. Similarly the space below the valve 44 and the space above the valve 43 both communicate with an outlet 48 which in the case of the change-over valve device 13b leads to the pipe 12c, while in the case of the device 13c the outlet 48 is connected by a pipe 49 with the main return pipe line 27. The spaces below the valves 43 and 46 are connected together by a passageway 50 leading to a connection 51, which in the case of both the devices 13b or c leads also to the main return pipe line 27. The valves 43, 44, 45 and 46 are adapted to be pressed off their seatings by axially slidable tappets 52, 53, 54 and 55, respectively, each of which passes through a packing cup 56 in order to prevent leakage of liquid. These packing cups are fitted into bushes 57 which are held in position by an inverted channel-shaped member 58, between the side flanges of which extend pivot pins 59 for a pair of T-shaped rocker members 60 and 61. The lower parts of these rocker members are somewhat bulb shaped and engage with recesses 62 and 63, respectively, formed in the upper part of a block 64 forming the body of a carriage, which is indicated generally at 65. This carriage 65 is supported from the body 40 by a pair of parallel link members 66 and 67 which are pivoted to the body at 68 and 69, respectively, and to the carriage 65 at 70 and 71, respectively. This permits the carriage 65 to move towards and away from the panel 42 in a substantially horizontal direction, such movement being limited by a depending projection 72 which is secured to the body 40 and has its lower part disposed between lugs 73 and 74 formed upon the carriage body 64. In practice, the carriage 65 is non-positively locked in either one of its two extreme positions owing to the provision of a plunger 75 which has a ridge-shaped head 76 adapted to be pressed upwards by a coiled compression spring 77 into firm engagement with either one of a pair of grooves 78 and 79 formed in the under surface of a lug 80 constituting part of the body 40.

The carriage body 64 is formed with a longitudinal bore 81 containing slidably a tubular integrating plunger 82, which latter has upon its underneath a series of conical recesses 83. A ball catch device comprising a ball 84 pressed upwards by a spring 85 acts to hold the integrating plunger 82 in any one of a number of positions by engaging with the recesses 83, the resistance to movement produced by the ball 84 being arranged to be less than that produced by the plunger 75. A control rod 86 having a knob 87 is fitted slidably within the integrating plunger 82 and these parts are normally urged to the position shown in Figure 1 by a coiled compression spring 88 acting between the end of the integrating plunger 82 and a washer 89 upon the control rod. It should be noted that the strength of the spring 88 is such that said spring is compressed by a force which is less than that required to dislodge the ball 84.

At its opposite end the integrating plunger 82 is formed with the previously mentioned set of ratchet teeth which are indicated at 30 in Figure 2 and are engaged by the pawl 29, the latter conveniently being pivoted at 90 to the corresponding piston valve member of the reversing valve device indicated at 21. The pawl 29 is urged into engagement with the ratchet teeth 30 by a leaf spring 91 but is adapted to be forced out of such engagement by a downwardly movable masking plate 92 which is accommodated within a diametral slit 93 formed in the integrating plunger 82. A plug 94 secured between the two limbs of the integrating plunger 82 serves to strength these limbs and also provide a bearing surface 95 for the masking plate 92, the opposite end of which latter bears slidably against the end surfaces of the slit indicated at 96. The adjacent part of the control rod is also bifurcated by a diametral slit indicated at 103 to embrace the masking plate 92, and it has its limbs connected by pins 97 and 98 which pass through oblique slots 99 and 100, respectively, formed in the masking plate. Thus movement of the control rod 86 to the left relative to the integrating plunger 82 causes the masking plate 92 to be moved downwards, so disengaging the pawl 29 from the teeth 30 and allowing said integrating plunger 82 to be moved freely towards the left during the action of resetting the change-over valve device.

Movement of the integrating plunger 82 to the left relative to the carriage body 64 is eventually arrested by suitable abutment means, such as by the engagement of a radially projecting pin 101 with the adjacent surface 102 of said carriage body 64. The extent to which the integrating plunger 82 can move in the opposite direction relative to the carriage body 64 is determined by an adjustable counting means, the arrangement of which is shown in Figure 3. A bracket 104 is secured to the carriage body 64 and carries a stud 105 upon which a drum member 106 is pivotally mounted, axial movement of the drum member 106 being prevented in the face of the change-over valve devices 13b and 13c by the provision of a nut 107 fitted upon the end of the stud 105. The end of the drum member 106 is reduced in diameter to form a shoulder 108 and this end part is also slit longitudinally at diametrically opposite positions as shown at 109 and 110, respectively, for the reception of a pin 111 carried by the spindle 112 of an adjusting knob 113. A coiled compression spring 114 keeps the knob 113 in snug engagement with a plate 115 secured to the panel 42. The outer curved surface of the drum member 106 is formed with a series of longitudinal grooves which are spaced circumferentially and are of various lengths, some of these grooves being indicated at 116, 117, 118 and 119. Any one of them can be brought into line with the radial pin 101 by turning the knob 113 to the appropriate position, and the length of the groove which is chosen determines the number of reciprocations of the pawl 29 which can be utilized to move the integrating plunger 82 towards the right relative to the carriage body 64 prior to the pin 101 engaging with the end wall 120 of the groove. The construction of the drum member 106 shown in Figure 3 corresponds to that of the counting means 16c of the change-over valve device 13c as this change-over valve device operates in conjunction with a blower device of the non-retractable type, i. e., one adapted to make any desired number of reciprocations. In the case of the change-over valve device 13b which works a blower device of the retractable type, the drum 106 is formed with only two grooves corresponding respectively with three and six reciprocations, for it will be remembered that in the retractable blower devices which are described three reciprocations occur between the time when the blower shaft starts moving from its retracting position until the time when it next returns to this position. Apart from this difference in the number of grooves in the drum member 106, however, the change-over valve devices 13b and c are identical.

The operation of each of the change-over valve devices 13b and 13c is as follows. To set the change-over valve device the control rod 86 is moved as far as possible to the left by pressing in the knob 87, and when this knob is released the parts assume the positions shown in Figures 2 and 3 with the carriage 65 to the left and the integrating plunger 82 also in its extreme left hand position so that the pin 101 is just clear of the drum member 106. The change-over valve device and the corresponding reversing valve device 18b or c is set into operation when pressure liquid is fed to the connection 12d through the appropriate pipe 12b or 12c. This liquid is unable to flow past the valve 44 because it is closed and consequently passes around the valve 45, said liquid leaving the change-over valve device by way of the connection 17d and thence flowing by the pipe 17b or c to the reversing valve device 18b or c. This causes the fluid motor unit 20 or 20c of the corresponding blower device 19b or 31c to be continuously reciprocated as above described, the piston valve member 21 moving to the left at the end of the first stroke and then to the right at the end of the second stroke and so on, said piston valve member 21 thus moving to the right at the end of each complete reciprocation of the fluid motor cylinder unit. It will be seen that these movements to the right cause the pawl 29 to urge the integrating plunger 82 to the right in a series of steps, each step having a length equal to the pitch of the ratchet teeth 30, which pitch is the same as the spacing between the recesses 83. The groove 119 which is in register with the pin 101 in the position of the knob 113 shown in Figure 3 is adapted to permit eight consecutive reciprocations of the fluid motor cylinder unit, and it is of such a length that movement of the integrating plunger 82 at the end of the seventh reciprocation brings the pin 101 substantially into engagement with the end wall 120 of the groove. At the end of the next reciprocation, therefore, when the integrating plunger 82 is forced to the right it carries with it the drum member 106. As this drum member is unable to move axially relative to the bracket 104 and the carriage 65 the latter is moved bodily to the right, the head 76 of the plunger 75 sliding out of the groove 78 and engaging with the groove 79. This movement of the carriage 65, of course, actuates the rockers 60 and 61 causing the valves 43 and 45 to close and the valves 44 and 46 to be opened by the upward movement of the tappets 53 and 55. As a consequence the pressure liquid entering through the connection 12d passes by way of the valve 44 to the outlet 48 leading, in the case of the change-over valve device 13b, to the next change-over valve device 13c by way of the pipe 12c. In the case of the change-over valve device 13c, which is regarded as being the last in the operational sequence, the outlet 48 returns the pressure liquid to the pump 10 by way of the pipe 49 and the return pipe line 27. The next time the soot blower devices are required to operate the action of pushing in the knobs 87 brings the parts once again to the positions shown in Figures 2 and 3, the drum member 106 then being readjusted, if necessary, to give a modified number of reciprocations.

The constructional details of the auxiliary valve device 14 and of the modified form of counting means 15 for the change-over valve device 13a are shown in Figures 4 to 7. The auxiliary valve device comprises a body 121 having a flange 122 by which it is secured to the partition 41, said body being drilled as shown to accommodate a valve ball 123 which is urged downwards on to its seating by a coiled compression spring 124. A pair of connections 125 and 126 communicate respectively with the spaces above and below the seating of the valve 123 and are coupled to the pipe 26 and the return pipe line 27, respectively, as shown in Figure 1. The valve 123 is adapted to be urged off its seating by a tappet 127 which passes through a packing ring 128 and at its lower end cooperates with a roller 129 mounted upon an arm 130. This arm is secured to a spindle 131 arranged in fixed pivots and carries below the roller 129 another roller 132. The roller 132 cooperates with the substantially V-shaped surface 133 of an angularly movable cam member 134 which is pivoted at 135 and is formed integrally with an arm 136, the latter having at its lower end a pin 137 engaging with a circumferential groove 138 formed in the drum member 106. This drum member has a pair of longitudinal grooves 139 and 140, the lengths of which are arranged to correspond with three and six reciprocations of the fluid motor cylinder unit 20. The pin 105 is in this instance sufficiently long to allow an axial movement of the drum member 106, this movement corresponding in length to one of the ratchet teeth 30, said drum member 106 being normally urged towards the left into engagement with the bracket 104 by a coiled compression spring 141. As a consequence of this movement the lengths of the grooves 139—140 are different from those above described, for the pin 101 is arranged to first engage the end of the groove just prior to the commencement of the penultimate reciprocation, that is the pin 101 will engage the end of the groove 139 at the end of the first reciprocation from the commencement of a blowing operation; on the other hand, if the groove 140 is being used in order to secure two complete blowing operations in sequence, i. e. six reciprocations of the fluid motor unit, the pin 101 will engage the end of the groove 140 as the fourth reciprocation terminates.

Figures 4, 5, 6:
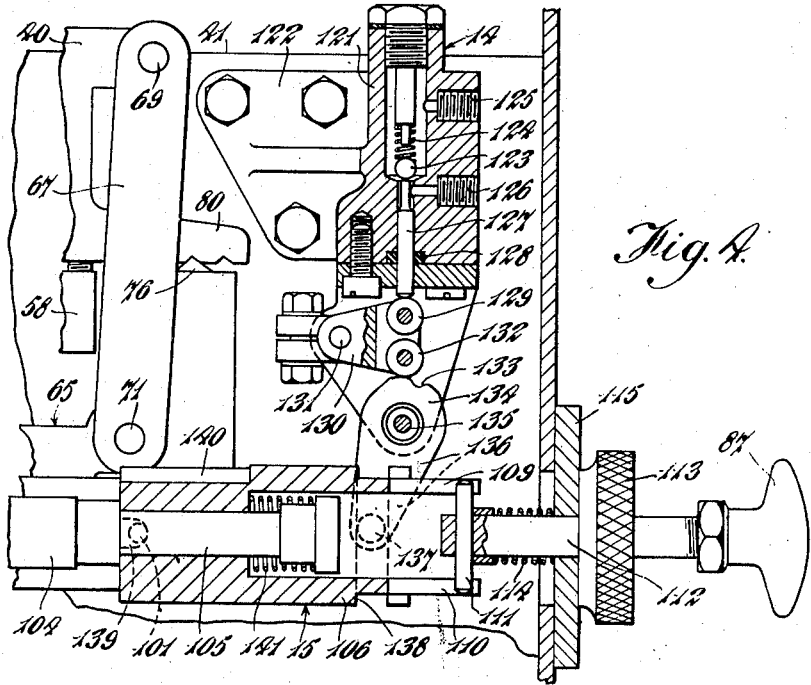
Figure 4 is a sectional elevation of the counting means and the auxiliary valve device which are associated with the first change-over valve device in Figure 1.
Figures 5 and 6 are fragmentary sectional views corresponding to Figure 4 and illustrating the various positions which are occupied by the parts.

In studying the action of the arrangements shown in Figures 4, 5 and 6, it will be assumed that the blower device 19a is required to make one complete blowing operation comprising three reciprocations. The change-over valve device 13a is, of course, set as in the previous examples by pushing in the knob 87, so that the integrating plunger 82 which is exactly the same as before takes up its extreme left hand position with the pin 101 just clear of the end of the drum member 106. Pressure liquid is supplied through the pipe 12 and at the end of the first reciprocation the integrating plunger 82 moves one step to the right, bringing the pin 101 to the position shown in Figure 4, the penultimate stroke then commencing. It will be noticed that during these first two strokes the cam member 134 is in the position shown in Figure 4 in which it holds open the valve 123, thus permitting the liquid rejected from the fluid motor unit 20 to flow from the reversing valve device 18a through the pipe 26 and freely back to the return pipe line 27. At the end of the penultimate stroke the integrating plunger in moving another step to the right shifts the drum member 106 along the pin 105 by compressing the spring 141, as will be seen in Figure 5. This moves the cam member 134 to a central vertical position and the engagement of the roller 132 in the recess of the V-shaped cam surface 133 enables the auxiliary valve 123 to close by pressing down the tappet 127. As a consequence during the last stroke of the blowing operation the working liquid rejected from the blower device 19a is prevented from passing back to the return pipe line 27 and instead it develops a certain relatively low pressure and is able to pass through the open valve 43 of the change-over valve device 13a and thence reach the second change-over valve device 13b by way of the pipe 12b. As the change-over valve device 13b is ready to operate, the knob 87 having been pushed in, the relatively low pressure liquid passes through the pipe 11b and is used to actuate the second retractable soot blower device 19b. As a result the two soot blower devices 19a and 19b work simultaneously in series using the same working liquid, and this effect is utilised to advantage in the present system for the blower device 19b is adapted to start its extending movement while the blower device 19a is still blowing. By the time, therefore, that the blower device 19a ceases to blow the device 19b is ready to commence blowing, and in this way no substantial time is lost as far as blowing is concerned in changing over from one device to another. The last reciprocation of the blower device 19a also includes a period when the nozzle of the said blower device 19a is not blowing but is being moved to its retracted position, and during this movement, of course, the nozzle of the blower device 19b is occupied in blowing and is finishing its first reciprocation. When, therefore, the third and final reciprocation of the blower device 19a comes to an end the next movement of the integrating plunger 82 to the right causes the pin 101 to shift the drum member 106 which, of course, transfers the carriage 65 to its right hand position, thus transferring the supply of pressure liquid to the pipe 12b so that the operation in series comes to an end and the pressure liquid is fed direct to the change-over valve device 13b by way of the pipe 12b. The position then occupied by the cam member 134 is shown in Figure 6, and it will be seen that the arm 130 is again raised, thus reopening the auxiliary valve 123.

With the soot blower system which is described it is only desirable to have the fluid motor units operating in series when a blower device of the retractable type is followed in the sequence by a blower which is also of the retractable type, as otherwise two nozzles might be blowing simultaneously, which is undesirable. As it is possible that the blower device 19b may be rendered out of action when the system is working owing to the fact that the operator has not pushed in the knob 87 of the change-over valve device 13b, an interlocking device is provided to prevent series operation in these circumstances. This interlocking device is shown in Figure 7, and it will be seen that the spindle 131 of the arm 130 is extended through the partition 41 and is fitted with an arm 142 having a projection 143 at its lower end. This arm 142 and the projection 143 are so positioned with respect to the drum member of the change-over valve device 13b (indicated at 106b in Figure 7), that the projection 143 is adapted to be engaged by the shoulder 108 of said drum member 106b when the latter is in the position which it occupies when its corresponding carriage 65 has been finally shifted by the pawl 29. The arm 142 and projection 143 are indicated in broken lines in Figure 3 in the positions which they occupy when the arm 130 is raised so as to open the auxiliary valve device 123. It follows that when the drum member 106 (see Figure 3) has been moved to the right with its carriage 65 the shoulder 108 effectively prevents the arm 130 from moving downwards, even although the cam member 134 may be disposed in its central vertical position. In this way the auxiliary valve 123 is prevented from closing at all times except during the last reciprocation of the blower device 19a, provided that the change-over valve device 13b has been set in order that the blower device 19b shall follow the blower device 19a in the working sequence.

In some cases that part of the last reciprocation of the blower device 19a during which blowing is taking place may be greater than the part of the first reciprocation of the blower device 19b which is used to advance the nozzle to the blowing point, and in these circumstances it is possible to prevent the two blower devices from blowing simultaneously by providing a device in the nature of a hydraulic accumulator adapted to delay the operation of the blower device 19b. This device is indicated in Figure 1, and comprises a cylinder 144 containing a piston 145 which is urged towards the closed end 146 of the cylinder by a light coiled compression spring 147. The working space within the cylinder is connected with the pipe 26 and the permissible stroke of the piston 145 is regulated so that the device absorbs the desired volume of liquid before the pressure builds up to a value sufficiently to operate the blower device 19b. When the blower device 19a finishes its operation the changing over of the valve device 13a opens the auxiliary valve device as previously explained, thus enabling the spring 147 to advance the piston 145 and return the liquid to the reservoir 11.

It will be appreciated that the system described is given merely as an example of the invention and is capable of being modified in numerous ways to suit requirements. Moreover, the improved liquid pressure remote control system is, of course, adaptable to uses other than the operation of soot blowers for boiler and like furnaces.

What I claim is:

1. In a hydraulic system including a plurality of motors to be driven in sequence, a source of pressure fluid and a reservoir, a control valve for one of the motors comprising, a housing establishing a passageway between said source and the respective motor, said reservoir and said respective motor, said source and the next motor in the sequence, and said reservoir and the next motor in the sequence, valve means biased to close all of the passageways, means mounted for rocking movement between two terminal positions, said last named means in first terminal position biasing the valve means in said passageways between said source and the respective motor and said reservoir and the next motor in the sequence to open position and in its other terminal position biasing the valve means in the other two passageways to open position, means including a lost motion connection for rocking said means mounted for rocking movement from one terminal position to the other, one of the elements of said last named means being driven by the respective motor whereby said respective motor will be actuated for a period determined by the magnitude of the lost motion but will be shut off in favor of the next motor in the sequence after said lost motion has been taken up.

2. A control valve for a hydraulic system as claimed in claim 1 further including means for adjustably predetermining the magnitude of the lost motion in the means for rocking the means mounted for rocking movement.

3. In a hydraulic system including a plurality of motors to be driven in sequence, a source of pressure fluid and a reservoir, a control valve for one of the motors comprising, a housing establishing a passageway between said source and the respective motor, said reservoir and said respective motor, said source and the next motor in the sequence, and said reservoir and the next motor in the sequence, valve means biased to close all of said passageways, means mounted for rocking movement between two terminal positions, said last named means in first terminal position biasing the valve means in said passageways between said source and the respective motor and said reservoir and the next motor in the sequence to open position and in its other terminal position biasing the valve means in the other two passageways to open position, a ratchet mounted for sliding movement in said housing, a portion of said rocking means lying in the path of movement of said ratchet, and a pawl connected to make a movement corresponding to a movement on the part of the respective motor, whereby the pawl will cause the ratchet to slide until it strikes the portion of the rocking means in its path of movement whereupon the latter will be actuated, the duration of the time of propulsion of the respective motor being dependent upon the amplitude of movement of the ratchet before it strikes said portion of said rocking means.

4. A control valve for a hydraulic system as claimed in claim 3 in which the portion of the rocking means lying in the path of the ratchet is an axially slotted cylinder, the various slots being of different axial lengths and further comprising means for selectively placing one of the slots in the path of movement of the ratchet whereby to afford adjustable lost motion between the ratchet and the rocking means so as to predetermine the duration of the actuation of the respective motor before the next motor is operated.

5. In a hydraulic system including a plurality of motors to be driven in sequence with a momentary intermediate period of simultaneous operation, a source of pressure fluid and a reservoir, a control valve system comprising, a valve housing establishing a passageway between said source and a first motor, said reservoir and said first motor, said source and the next motor in the sequence, and said reservoir and the next motor, valve means biased to close all of said passageways, a return line leading from the first motor to the reservoir, an auxiliary valve in said line normally biased to closed position, a rocking link holding said valve in open position at either terminal of its rocking movement but permitting the valve to close at a point intermediate its terminal positions, the passageway between said reservoir and said next motor leading into said return line at a point between the first motor and the valve therein, means mounted for rocking movement between two terminal positions, said last named means in a first terminal position biasing the valve means in said passageways between said source and said first motor and said next motor and said reservoir to open position, and in its other terminal position biasing the valve means in the other two passageways to open position, a member axially slidable in said housing, a movable element in the path of movement of said sliding member, means connecting said rocking link to said element so that it will be rocked from one terminal position to the other upon displacement of said element, an abutment connected to said rocking means and lying in the path of movement of said element, a spring between said abutment and said element, and means for axially sliding said axially slidable member in a series of like steps each responsive to the completion of a movement on the part of the first motor, whereby it will run alone until the axially slidable member has moved a number of steps sufficient to bring it into contact with the element whereupon the next step will displace the said element to take up the lost motion of the spring between the element and the abutment and to move the link to its intermediate position causing the next motor to operate by supplying exhaust fluid from the first motor thereto while the following step will cause displacement of the abutment and the rocking means to shut off the passageways from the source to the first motor and to open them to the next motor and will result in rocking the link to its other terminal position to open the valve controlled thereby so that only the next motor is supplied with pressure fluid.

6. A control valve system for a hydraulic system as claimed in claim 5 in which the next motor is also provided with a control assembly including rocking means the position of which determines whether the motor will be supplied with fluid or whether the fluid will be passed on, and means responsive to that position of the last-mentioned rocking means in which the fluid is passed on for preventing the closing of the auxiliary valve means when its rocking link is at its intermediate position.

ROBERT EDGAR JELFS.